United States Patent [19]

Sham

[11] Patent Number: 5,400,701
[45] Date of Patent: Mar. 28, 1995

[54] STEAM COOKING APPLIANCE

[76] Inventor: John C. K. Sham, Room 1508, Block C, 19 Broadhead Road, Hong Kong, Hong Kong

[21] Appl. No.: 180,844

[22] Filed: Jan. 12, 1994

[51] Int. Cl.[6] .................................. A47J 27/04
[52] U.S. Cl. ................................ 99/410; 99/446; 99/450; 126/369; 219/401
[58] Field of Search ............... 99/446, 410, 413, 416, 99/417, 411, 415, 412, 414, 450; 126/369, 369.2; 219/401, 415

[56] References Cited

U.S. PATENT DOCUMENTS

| | | | |
|---|---|---|---|
| D. 277,357 | 1/1985 | Levine | D7/409 |
| D. 279,956 | 8/1985 | Eyck et al. | D7/354 |
| D. 280,064 | 8/1985 | Obata et al. | D7/360 |
| D. 300,598 | 4/1989 | Ueda et al. | D7/360 |
| D. 330,825 | 11/1992 | Sekita et al. | D7/354 |
| 2,719,211 | 9/1955 | Lewis et al. | 126/369 |
| 3,500,818 | 3/1970 | Elias | 126/369 |
| 3,644,709 | 2/1972 | Hojo | 219/441 |
| 3,908,111 | 9/1975 | Du Bois et al. | 219/442 |
| 4,148,250 | 4/1979 | Miki et al. | 99/415 |
| 4,197,791 | 4/1980 | Vieceli et al. | 99/450 |
| 4,234,783 | 11/1980 | Aoshima | 219/441 |
| 4,241,288 | 12/1980 | Aoshima et al. | 219/441 |
| 4,307,287 | 12/1981 | Weiss | 219/442 |
| 4,313,051 | 1/1982 | Aoshima | 219/441 |
| 4,315,138 | 2/1982 | Miwa | 219/441 |
| 4,315,139 | 2/1982 | Onishi et al. | 219/441 |
| 4,316,447 | 2/1982 | Foreman | 126/369 |
| 4,362,923 | 12/1982 | Aoshima | 219/441 |
| 4,421,974 | 12/1983 | Oota et al. | 219/441 |
| 4,426,923 | 1/1984 | Ohata | 219/401 |
| 4,431,906 | 2/1984 | Oota et al. | 219/441 |
| 4,438,324 | 3/1984 | Narita et al. | 219/441 |
| 4,441,016 | 4/1984 | Oota et al. | 219/441 |
| 4,463,249 | 7/1984 | Narita et al. | 219/441 |
| 4,509,412 | 4/1985 | Whittenburg et al. | 99/413 |
| 4,617,452 | 10/1986 | Miwa | 219/441 |
| 4,625,097 | 11/1986 | Miwa | 219/441 |
| 4,650,968 | 3/1987 | Williams | 219/401 |
| 4,670,282 | 6/1987 | Onishi et al. | 219/441 |
| 4,672,179 | 6/1987 | Onishi et al. | 219/441 |
| 4,674,890 | 6/1987 | Kojima et al. | 368/107 |
| 4,728,778 | 3/1988 | Choi et al. | 219/438 |
| 4,739,698 | 4/1988 | Allaire | 99/410 |
| 4,920,251 | 4/1990 | Whitenack et al. | 219/401 |
| 4,982,656 | 1/1991 | Stone | 99/450 |
| 5,069,198 | 12/1991 | Henderson | 126/369 |
| 5,092,229 | 3/1992 | Chen | 99/413 |
| 5,097,753 | 3/1992 | Naft | 99/446 |
| 5,189,947 | 3/1993 | Yim | 126/369 |

FOREIGN PATENT DOCUMENTS 2583141 12/1986 France.
2593587 7/1987 France.
2846339 5/1980 Germany.

Primary Examiner—David A. Scherbel
Assistant Examiner—Reginald L. Alexander
Attorney, Agent, or Firm—Dilworth & Barrese

[57] ABSTRACT

A steam cooking appliance which enables food to be steam cooked while preventing condensate residue to be re-boiled again. The steam cooking appliance of the present invention provides a water containment basin defining a water reservoir and a condensate basin wherein the water reservoir is isolated from the condensate basin. The steam cooking appliance operates to enable the water reservoir to remain free from condensate residue even after boiling dry.

20 Claims, 6 Drawing Sheets

STEAM COOKING APPLIANCE

BACKGROUND OF THE INVENTION

1. Field of the Invention

This invention relates generally to devices for steam cooking food in the home, and more particularly to an electrically powered steam cooking appliance that may be left to boil dry without burning or emitting foul odors.

2. Description of Related Art

The use of steam cooking utensils and appliances has grown in recent years due to the ever growing health consciousness of the population. Cooking food by steam has numerous attributable nutritional benefits. For example, valuable minerals are retained in foods such as vegetables if they are steamed in contrast to being cooked by other conventional means, such as boiling.

Food steaming is well known, and until recently was performed by placing food on racks inside generally conventional stovetop cooking utensils. Such utensils generally took the form of large saucepans or the like, with loosely fitted gravity-closed covers.

The above method for steam cooking food is disadvantageous in that the cooking utensil occupies a burner on the stove which otherwise might have been used for some other cooking utensil. Further, it requires heating substantially the entire cooking utensil to the temperature of boiling water, before steaming could begin. This is wasteful in terms of time, since the user must wait for the whole vessel to come to temperature in addition to waiting for the food to cook thereafter. Further, it is wasteful in terms of energy, since the entire heat capacity of the cooking utensil has to be radiated with heat in order to vaporize a generally small amount of water.

In recent years, the advent of the electric steaming appliance has proven advantageous over the above mentioned stovetop cooking utensil. The electric steaming appliance generally includes a base portion having a water reservoir and an electric heating element so as to generate steam, typically through boiling, from water which is contained within the water reservoir. Provided in the typical electric steaming appliance is at least one food tray which is typically provided with a perforated bottom wall, whereupon food would be disposed. Steam generated from the electric heating element effectively cooks the food disposed on the perforated wall of the food tray and any condensed water arising from the steam passes through the perforated wall of the food tray and returns to the water reservoir in the base portion.

However, the above mentioned electric steaming appliance is disadvantageous in that the perforated bottom wall of the food tray permits the condensed steam which contacts the food, food juices or food drippings, to return to the water reservoir. The condensed steam or food juices are then boiled again causing foul odors to be emitted from the electric steaming appliance. Moreover, if the electric steaming apparatus boils dry, food matter carried by the condensate or food drippings may bake on the water reservoir surface causing further foul odors while also making the cleaning of the water reservoir a difficult chore.

Thus, there presently exists a need to provide a steam cooking appliance which may be left to boil dry without the emission of foul odors.

SUMMARY OF THE INVENTION

The present invention provides an electric steam cooking appliance which segregates condensed water drippings from the original steam source.

The present invention generally includes a base portion which defines a water containment basin. The water containment basin includes a water reservoir and a condensate basin which is thermally isolated from the water reservoir. The water containment basin is provided with an upstanding peripheral wall which is dimensioned and configured to facilitate the separation between the water reservoir and the condensate basin. Heating means are mounted in the base portion and are preferably centrally located in the water reservoir so as to generate steam from water contained in the water reservoir. Preferably, the heating means instantaneously generates steam through vaporization so that only water admitted to the heater is steamed, thus avoiding the necessity of boiling the entire capacity of the water reservoir at once. A check valve assembly in the form of a ball valve is preferably provided in the base portion to admit only a predetermined amount of water to the heater at a time.

A drainage tray having a perforated bottom wall is supported directly above the water containment basin in the base portion. The bottom wall of the drainage tray is preferably provided with a multiplicity of apertures dimensioned and configured to permit the upward passage of steam and downward passage of condensed water vapors therethrough. A food tray having an imperforate bottom wall is disposed atop the perforated bottom wall of the drainage tray. The diameter of the bottom wall of the food tray is preferably less than the diameter of the bottom wall of the drainage tray so as to enable steam which is generated from the heating means to pass upward through the drainage tray and contact and cook the food contained within the food tray. Further, steam which has condensed about the inner peripheral wall of the drainage tray and the opposing outer peripheral wall of the food tray is enabled to pass downward through the perforated bottom wall of the drainage tray and pass only into the condensate basin of the water containment basin.

Thus, the perforated bottom wall surface of the drainage tray, along with the differing diameters of the bottom walls of the drainage tray and the food tray facilitate the upward passage of steam from the water reservoir so as to cook the food contained within the food tray while also permitting the downward passage of condensate for disposal into the condensate basin so as not to be boiled again.

Another preferred embodiment of the steam cooking appliance is provided including a condensate tray which is releasably supported in the base portion above the water containment basin. The condensate tray is provided with a recessed condensate trough which is dimensioned and configured to be slidably received in the condensate basin defined in the base portion. The condensate tray is provided with a centrally located opening aligned with the heating means so as to facilitate the upward passage of steam from the heating means to the food tray. The recessed condensate trough collects the accumulate condensate during the cooking process, and after the cooking process has been completed, the condensate tray is removed from the base portion to facilitate easy disposal of the accumulated condensate within the trough of the condensate tray.

BRIEF DESCRIPTION OF THE DRAWINGS

Further features of the present invention will become more readily apparent from the following detailed description of the invention taken in conjunction with the accompanying drawings, in which.

DETAILED DESCRIPTION OF THE PREFERRED EMBODIMENT

Referring now to the various figures of the drawings, a preferred embodiment of the present invention shall be described in detail. In referring to the several figures of the drawings, like numerals shall refer to like parts.

Figure 1:
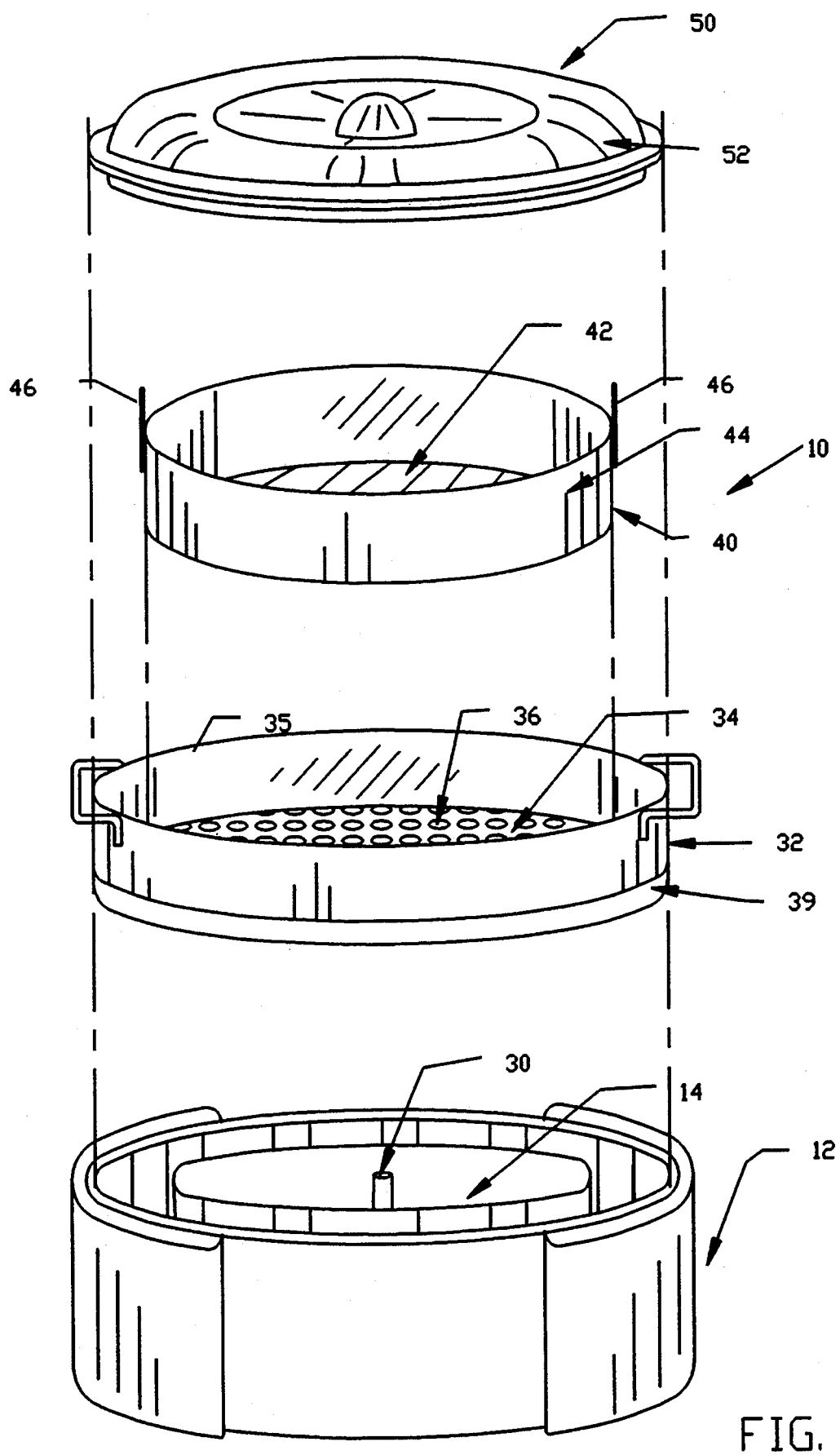
FIG. 1 illustrates an exploded perspective view of a steam cooking appliance in accordance with the present invention.
Figure 4:
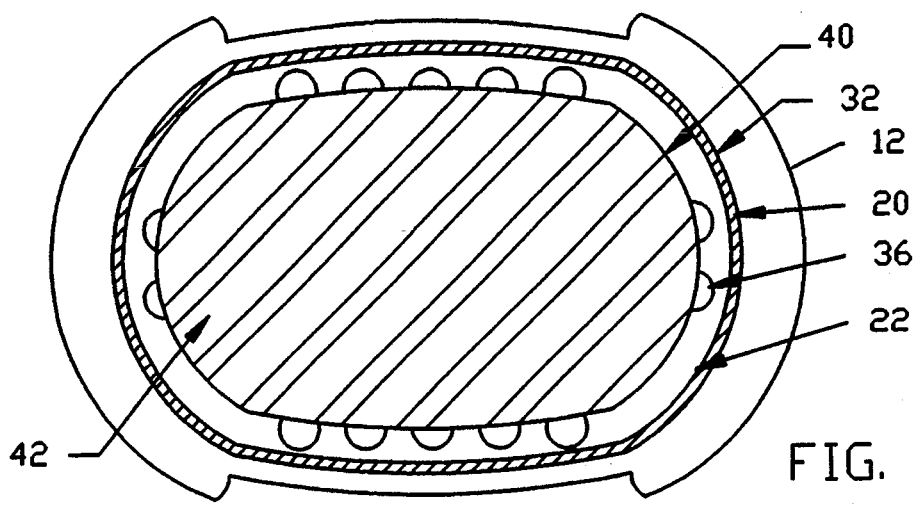
FIG. 4 illustrates a top planar view of the food tray being nested within the drainage tray of the steam cooking appliance of FIG. 3.
Figure 2:
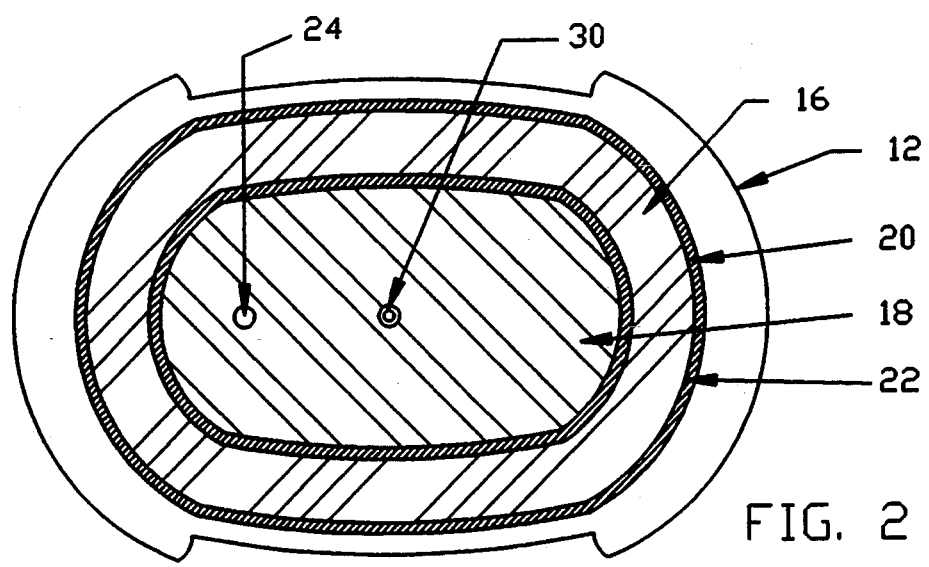
FIG. 2 illustrates a top planar view of the water containment basin defined by the base portion of the steam cooking appliance of FIG. 1.
Figure 5:
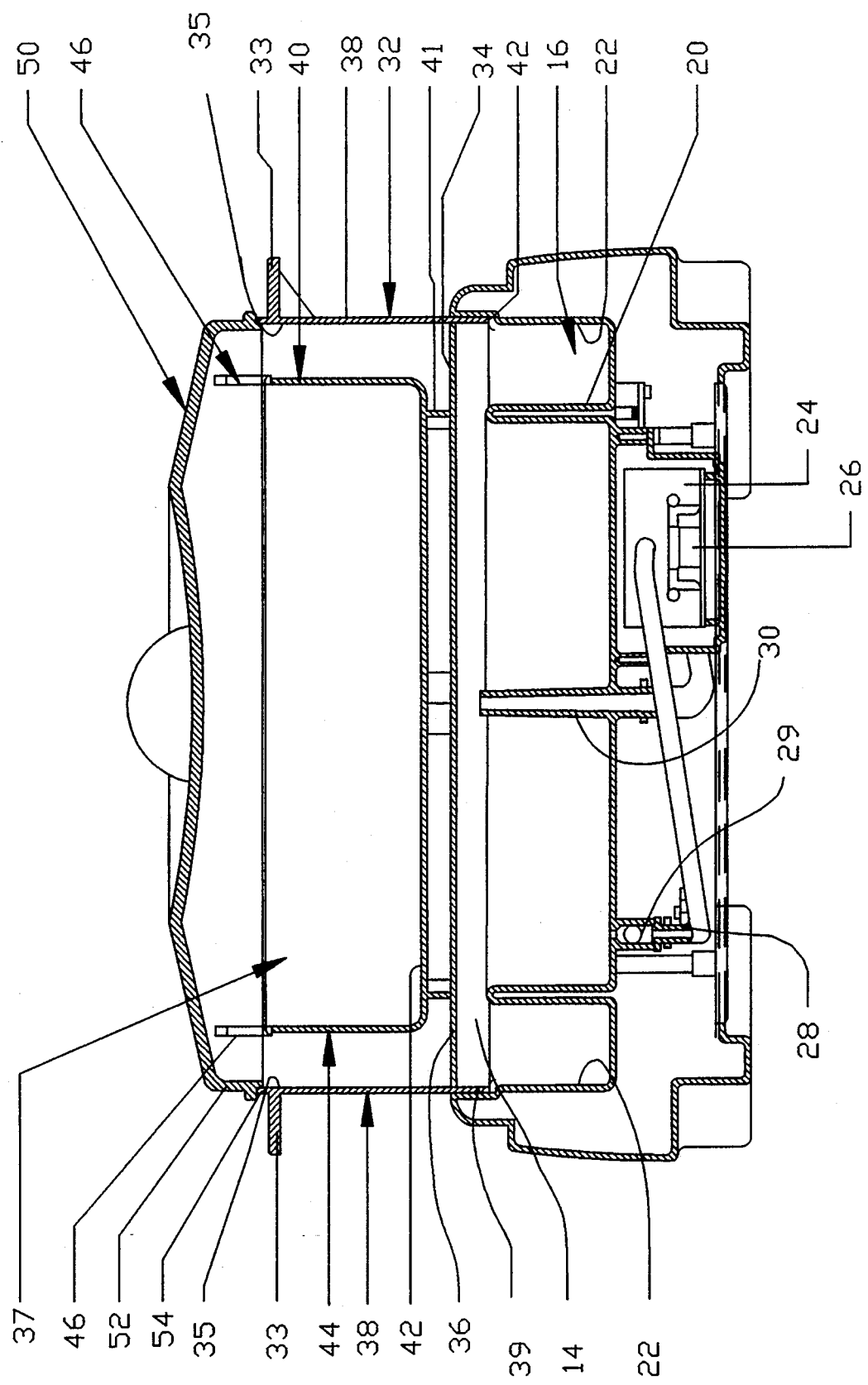
FIG. 5 illustrates a cross-sectional view of the assembled steam cooking appliance according to the present invention.

FIGS. 1-6 illustrate a preferred embodiment of the steam cooking appliance shown generally at 10. As shown in FIGS. 1, 2 and 5, the steam cooking appliance 10 includes a base portion 12 which defines a water containment basin 14. As best shown in FIGS. 2 and 5, the water containment basin 14 includes a condensate basin 16 disposed in annular relationship to a water reservoir 18. The condensate basin 16 and water basin 18 are preferably ellipsoidal in shape. An inner peripheral wall 20 separates the condensate basin 16 from the water reservoir 18. The inner peripheral wall 20 is preferably ellipsoidal in shape and is stamped formed from the material comprising basins 16 and 18, preferably aluminum. The condensate basin 16 is also bounded by an outer peripheral wall 22 being defined by the base portion 12, whereby the outer peripheral wall 22 is also preferably ellipsoidal in shape, although appliance 10 may, of course, have any shape.

Figure 6:
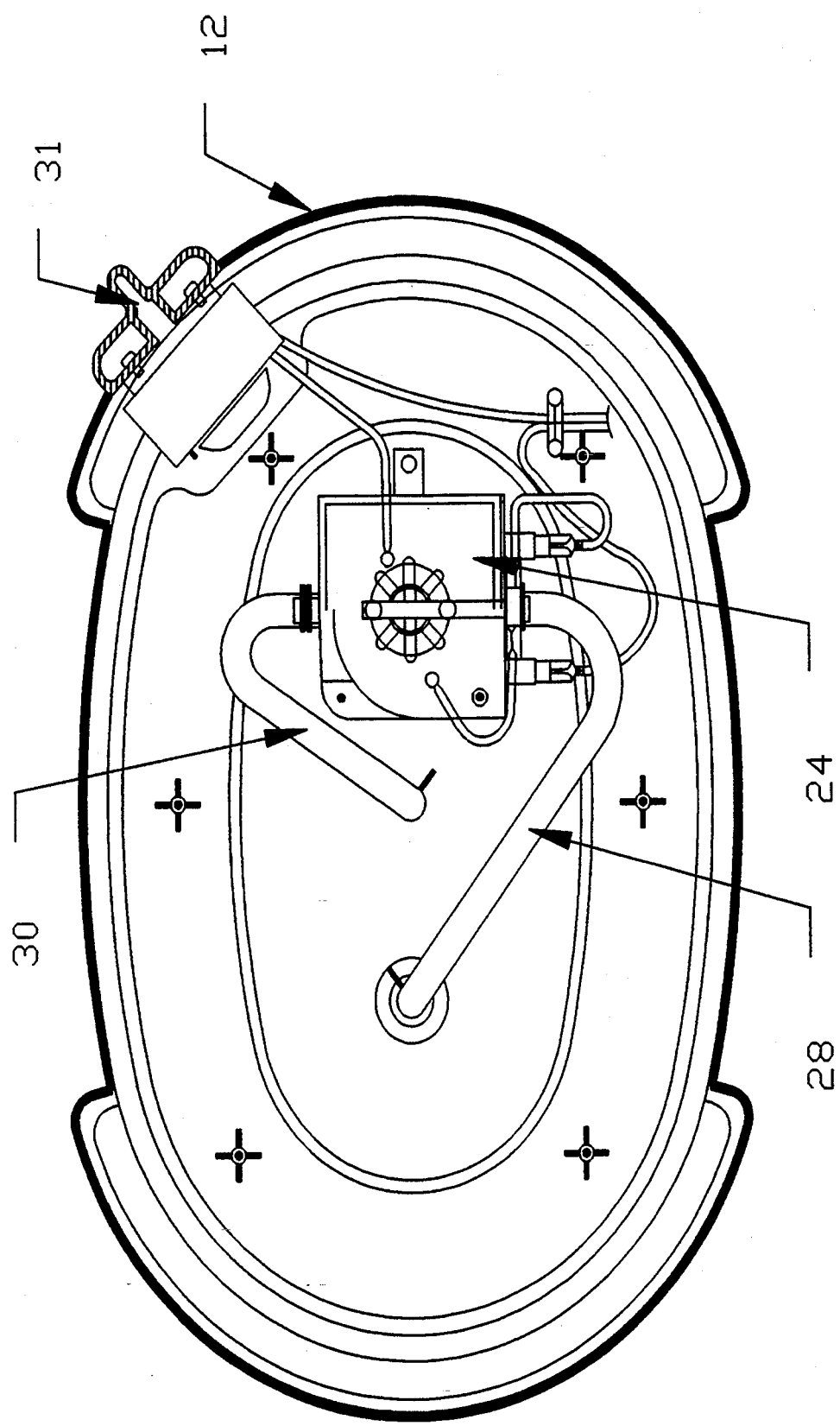
FIG. 6 illustrates a bottom view of the appliance of FIG. 5.

Referring to FIGS. 5 and 6, a heater 24 is mounted underneath the water reservoir 18 in the base 12 and is configured to provide heat to the water contained in the water reservoir 18 so as to transform the water into steam. In particular, the heater 24 is configured to instantaneously transform water which is disposed in the water reservoir 18 to be vaporized into steam so as to facilitate the cooking of food which is disposed within the steam cooking appliance 10. The heater 24 includes an intake assembly 28, such as a check valve assembly 29, for transferring liquid from the water reservoir 18 into the heater 24, therein enabling the liquid to be converted into steam, via the heater 24. A steam pipe 30 is also connected to the heater 24 and is functional to disperse generated steam from the heater 24 to a food tray 40 disposed atop the base portion 12, as will be discussed in more detail below. Preferably, the steam pipe 30 centrally projects upwardly from the water reservoir 18.

The base portion 12 preferably also includes an "ON/OFF" switch (FIG. 6) for selectively connecting the steam cooking appliance 10 to a source of electrical power. The "ON/OFF" 31 switch may include a timer (not shown) so that electrical power is only delivered to the steam cooking appliance 10 for a predetermined period of time.

A thermostat 26 is mounted in the base portion 12 and is thermally and electrically coupled to the heater 24. The thermostat 26 is functional to de-energize the heater 24 in the event that all of the water in the water reservoir 18 has evaporated while the heater is still energized. For example, the thermostat may be configured to open at a predetermined switching temperature and is circuited such that the power is then removed from the heater 24.

Figure 3:
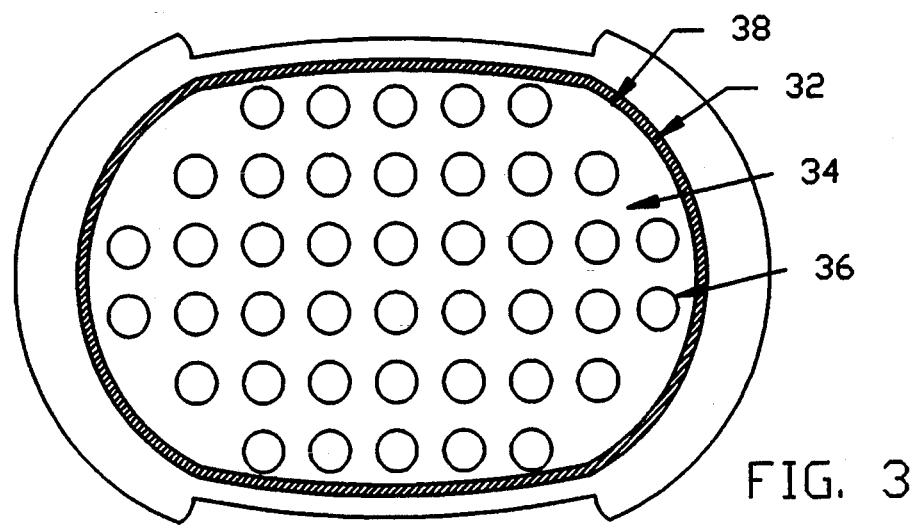
FIG. 3 illustrates a top planar view of the drainage tray being supported above the water containment basin in the base portion of the steam cooking appliance of FIG. 2.

FIGS. 1, 3 and 5 illustrate a drainage tray 32 which is provided in the steam cooking appliance 10. The drainage tray 32 is preferably ellipsoidal in shape and comprises a perforated bottom wall 34 having a multiplicity of through apertures 36 for enabling steam generated in the water reservoir 18, via the heater 24, to flow upward in the cooking space 37 defined by the food tray 40 while also permitting condensed steam vapor to pass downward into the condensate basin 16. About the periphery of the bottom wall 34 of the drainage tray 32, a continuous upstanding sidewall 38 extends therefrom forming an open end 35 opposite the bottom wall 34. The drainage tray 32 further includes a pair of spaced outwardly extending handles 33 which may be grasped by the user for raising the drainage tray 32 upwardly relative to the base portion 12. A downward projecting lip 39 also extends from the periphery of the bottom wall 34 of the drainage tray 32 and is dimensioned and configured such that the downward projecting lip 39 receives into the base portion 12 and is supported, as illustrated in FIG. 5, by an annular ridge 42 defined in the outer peripheral wall 22 of the base portion 12. As best shown in FIG. 5, the drainage tray 32 is supported in the base portion 12 directly above the condensate basin 16 and the water reservoir 18. The significance of the perforations 36 of the drainage tray 32 being mounted directly above the water containment basin 14 will be described below.

The steam cooking appliance 10 also includes a food tray 40 which is dimensioned and configured to be nested within the drainage tray 32, as best shown in FIGS. 1 and 5. The food tray 40 is used for cooking such food as rice or vegetables and is preferably ellipsoidal in shape. The food tray 40 comprises an imperforate bottom wall surface 42 and a continuous side wall 44 extending upwardly therefrom. FIGS. 2 and 5 illustrate the food tray 40 being nested within the drainage tray 32 such that the food tray 40 is disposed directly above the entire region of the water reservoir 18 and, at most, only partially above the condensate basin 16, the significance of which will be described below. The food tray 40 additionally includes a pair of spaced upwardly extending ears 46 which may be grasped by the user for raising the food tray 40 upwardly relative to the drainage tray 32.

As illustrated in FIGS. 1 and 5, the steam cooking appliance 10 additionally includes a lid 50 having a bottom opening defined by a rim 52, which is dimensioned and configured such that the lid 50, in particular the rim 52, cooperates with the open end 35 of the drainage tray 32 so as to effectively form an outer seal 54 (FIG. 5) preventing the escape of steam. The lid 50 may be configured to include a plurality of openings (not shown) therein providing ventilation means.

In use, the water reservoir 18 of the water containment basin 14 is first filled with a measured amount of water. The drainage tray 32 is then supported in the base portion 12 directly above the water containment basin 14. Then, food is placed upon the imperforate bottom wall 42 of the food tray 40, and the food tray 40 is positioned upon the perforated bottom wall 34 at feet 41 which spaces the food tray 40 above the drainage tray 32. The lid 50 is then positioned adjacent the open end 35 of the drainage tray 32 so as to form the outer seal 54. The steam cooking appliance 10 is then plugged into a conventional wall outlet. The heater 24 thereafter heats the water which is received from the water reservoir 18, via the intake assembly 28, and steam quickly forms and is expelled into and about the food tray 40, via the steam pipe 30, and through the perforated bottom wall 34 of the drainage tray 32. Thereafter, the steam contacts upon the food disposed within food tray 40, thereby facilitating the heating and cooking of the food. Condensate which forms on the upstanding side wall 38 of the drainage tray 32 and adjacent upstanding side wall 44 of food tray 40 accumulates and passes into the condensate basin 16, via the perforated bottom wall 34 of the drainage tray 32. This is so, because by positioning the imperforate bottom wall 42 of the food tray 40 upon the bottom wall 34 of the drainage tray 32 and directly above the entire region of the water reservoir 18, condensate is thereby effectively prevented from passing into the water reservoir 18, and thus, may only pass into the condensate basin 16.

Thus, the condensate which forms on the respective sidewalls, 38 and 44, does not return to the water reservoir 18, but rather passes into the condensate basin 16 wherein the condensate is not re-boiled again because, as mentioned above, the condensate basin 16 is segregated from the heater 24 and the water reservoir 18. Thus food matter does not accumulate on the bottom surface of water reservoir 18 adjacent heater 24 when the system boils dry thereby avoiding the emittance of foul odors and difficult cleaning of the steam cooking appliance 10.

Figure 7:
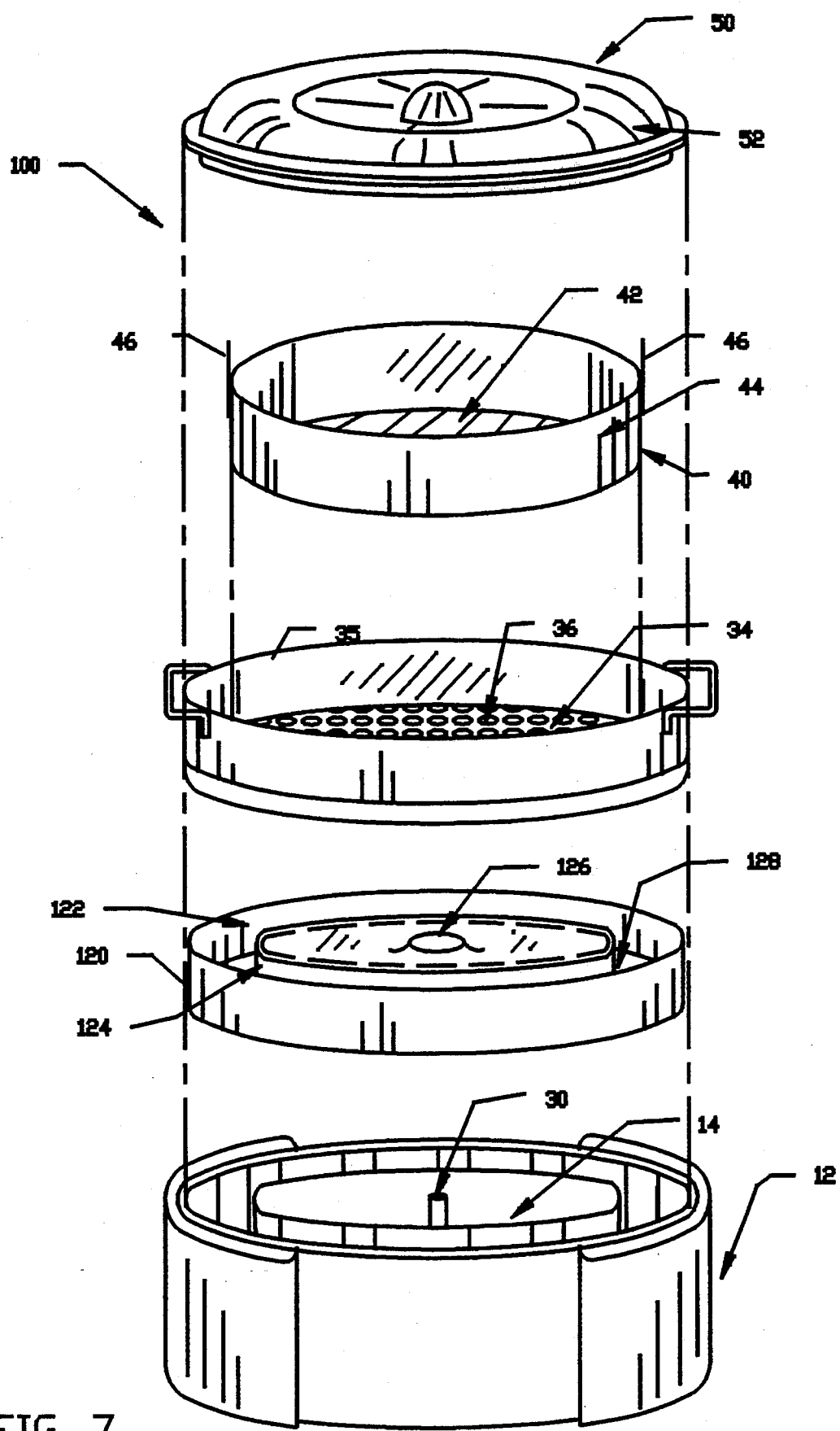
FIG. 7 illustrates an exploded perspective view of another preferred embodiment of a steam cooking appliance constructed in accordance with the present invention.
Figure 8:
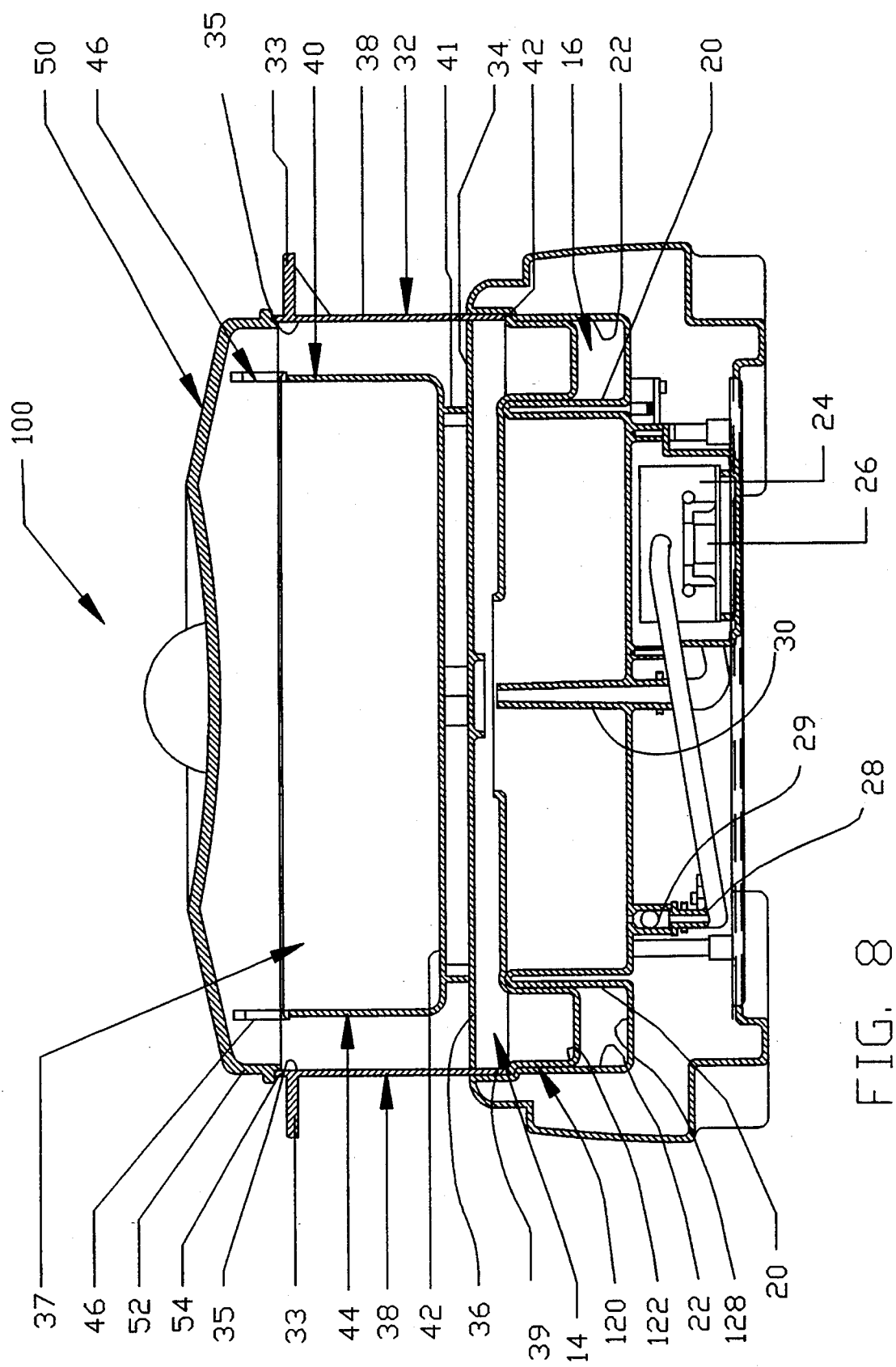
FIG. 8 illustrates a cross-sectional view of the assembled steam cooking appliance of FIG. 7.

In yet another preferred embodiment of the present invention illustrated in FIGS. 7 and 8 a steam cooking appliance 100 is provided which is substantially identical to the steam cooking appliance 10 illustrated in FIGS. 1–6 except for the provision of a removable condensate tray 120. The removable condensate tray 120 is advantageous in that it enables the accumulated condensate to be easily discarded during the cleaning process of the steam cooking appliance 100.

The condensate tray 120 is dimensioned and configured to be supported by the respective outer and inner peripheral walls 22 and 20. Specifically, the condensate tray 120 includes a recessed condensate trough 122 concentrically positioned about and spaced from an annular inner wall 124. The annular inner wall 124 defines an opening 126 which is axially aligned with the steam pipe 30 of the heater 24. The bottom wall 128 of the condensate basin 120, including the recessed condensate trough 122, is defined by an imperforate surface. The annular recessed condensate trough 122 is dimensioned and configured for releasable reception into the condensate basin 16.

In use, the condensate tray 120 is supported in the base portion 12 above the water containment basin 14, and in particular, the recessed condensate trough 122 is releasably received into the condensate basin 16 and the opening 126 is axially aligned with the steam pipe 30. The drainage tray 32 is then supported in the base portion 12 directly above the condensate tray 120. As fully set forth above, food is then placed upon the imperforate bottom wall 42 of the food tray 40, whereupon the food tray 40 is positioned on the perforated bottom wall 34 of the drainage tray 32 at feet 41 which spaces the food tray 40 above the drainage tray 32.

The operation of the steam cooking appliance is substantially identical to the operation of the steam cooking appliance 10 illustrated in FIGS. 1–6 and fully described above. However, the operation of steam cooking appliance 100 differs from that illustrated in FIGS. 1–6 in that the accumulated condensate does not pass into the condensate basin 16, but rather passes into the recessed condensate trough 122 of the condensate tray 120. This is advantageous, in that, during the cleaning process, the condensate tray 120 is simply removed from the base portion 12 which enables the accumulated condensate to be easily discarded, thereby avoiding the need to handle and manipulate the base portion 12 to discard the accumulated condensate. Thus, the provision of the condensate tray 120 simplifies the cleansing process of the steam cooking appliance 100.

While the invention has been particularly shown and described with reference to the preferred embodiments, it will be understood by those skilled in the art that various modifications in form and detail may be made therein without departing from the scope and spirit of the invention. Accordingly, modifications such as those suggested above, but not limited thereto, are to be considered within the scope of the invention.

What is claimed is:

1. A steam cooking appliance comprising:
   a) a base portion;
   b) a water containment basin defined in said base portion, said water containment basin including a water reservoir and a condensate basin isolated from said water reservoir;
   c) heating means mounted in said base portion for receiving and heating water from said water reservoir to form steam;
   d) means for delivering water from said water reservoir to said heating means;
   e) means for delivering steam from said heating means to a location above said water containment basin;
   f) a drainage tray having a perforated surface, said drainage tray being supported above said water containment basin; and
   g) a food tray having an imperforate surface, said imperforate surface of said food tray being disposed above said perforated surface of said drainage tray such that condensed water passes into said condensate basin of said water containment basin.

2. A steam cooking appliance as recited in claim 1, further comprising a cover portion dimensioned and configured to sit atop said drainage tray.

3. A steam cooking appliance as recited in claim 1, further including a thermostat mounted in said base portion and coupled to said heating means.

4. A steam cooking appliance as recited in claim 1, wherein said drainage tray further includes an annular outer wall extending from said perforated surface.

5. A steam cooking appliance as recited in claim 4, wherein said food tray further includes an annular outer wall extending from said imperforate surface, said annular outer wall of said food tray being dimensioned to have a smaller diameter than said annular outer wall of said drainage tray.

6. A steam cooking appliance as recited in claim 1, wherein said perforated surface of said drainage tray defines a multiplicity of apertures to facilitate the passage of steam from said heater means to said food tray.

7. A steam cooking appliance as recited in claim 1, wherein said water containment basin includes an inner peripheral wall dimensioned and configured to separate said water reservoir from said condensate basin.

8. A steam cooking appliance as recited in claim 1, wherein said means for delivering steam from said heating means includes a steam pipe centrally projecting upwardly from said heating means through said water reservoir.

9. A steam cooking appliance as recited in claim 8, wherein said means for delivering water from said water reservoir to said heating means further includes a check valve assembly for metering water for delivery from said water reservoir to said heating means.

10. A steam cooking appliance as recited in claim 9, wherein said heating means is configured to instantaneously vaporize water-which is delivered from said water reservoir so as to be expelled as steam from said steam pipe.

11. A steam cooking appliance comprising:
a) a base;
b) a water containment basin defined in said base, said water containment basin including a first compartment forming a water reservoir and a second compartment isolated from said water reservoir;
c) a heater mounted in the base portion and disposed adjacent said water reservoir for receiving and heating water from said reservoir to form steam;
d) means for delivering water from said water reservoir to said heater;
e) a steam pipe extending from said heater for delivering steam to a location above said water containment basin;
f) a condensate tray supported in said base above said water containment basin and including an opening aligned with said steam pipe of said heater, and an annular recessed trough defined about an outer periphery of said condensate tray, said trough being dimensioned and configured to be slidably received in said second compartment of said water containment basin;
g) a drainage tray having a perforated surface, said drainage tray being supported above said condensate tray, said perforated surface defining a multiplicity of apertures to facilitate the passage of steam from said steam pipe of said heater therethrough; and
g) a food tray including an imperforate surface, said imperforate surface of said food tray being disposed above said perforated surface of said drainage tray thereby enabling condensed water to pass through said perforated surface of said drainage tray and into said recessed trough of said condensate tray.

12. A steam cooking appliance as recited in claim 11, further comprising a cover portion dimensioned and configured to sit atop said drainage tray.

13. A steam cooking appliance as recited in claim 11, further including a thermostat mounted in said base and coupled to said heater.

14. A steam cooking appliance as recited in claim 11, wherein said drainage tray further includes an annular outer wall extending from said perforated surface.

15. A steam cooking appliance as recited in claim 14, wherein said food tray further includes an annular outer wall extending from said imperforate surface, said annular outer wall of said food tray being dimensioned to have a smaller diameter than said annular outer wall of said drainage tray.

16. A steam cooking appliance as recited in claim 11, wherein said steam pipe projects upwardly through said water reservoir.

17. A steam cooking appliance as recited in claim 16, wherein said means for delivering water from said water reservoir to said heater further includes a check valve assembly for metering water from said water reservoir to said heater.

18. A steam cooking appliance as recited in claim 17, wherein said heater is configured to instantaneously vaporize water which is delivered from said water reservoir to be expelled as steam from said steam pipe.

19. A steam cooking appliance comprising:
a) a base portion;
b) a water reservoir defined in said base portion;
c) heating means mounted in said base portion for receiving and instantaneously heating water from said water reservoir;
d) a steam pipe connected to said heating means and mounted in said base portion for delivering steam to a location above said water reservoir;
e) a condensate tray supported in said base portion positioned above said water reservoir and including an opening axially aligned with said steam pipe;
f) a drainage tray having a perforated surface, said drainage tray being supported by said base portion above said condensate tray; and
g) a food tray having an imperforate surface, said imperforate surface of said food tray being disposed above said perforated surface of said drainage tray such that condensed water passes into said condensate tray.

20. A steam cooking appliance as recited in claim 19, wherein said condensate tray is provided with a recessed trough along an outer periphery of said condensate tray.

* * * * *